(12) United States Patent
Radrich et al.

(10) Patent No.: US 10,875,176 B2
(45) Date of Patent: Dec. 29, 2020

(54) PROCESS CONTROL USING DEEP LEARNING TRAINING MODEL

(71) Applicant: KUKA Deutschland GmbH, Augsburg (DE)

(72) Inventors: Helmuth Radrich, Austin, TX (US); Aaron Dennis, Round Rock, TX (US)

(73) Assignee: KUKA Systems North America LLC, Sterling Heights, MI (US)

( * ) Notice: Subject to any disclaimer, the term of this patent is extended or adjusted under 35 U.S.C. 154(b) by 263 days.

(21) Appl. No.: 15/945,314

(22) Filed: Apr. 4, 2018

(65) Prior Publication Data

US 2019/0308315 A1  Oct. 10, 2019

(51) Int. Cl.
*B25J 9/16* (2006.01)

(52) U.S. Cl.
CPC ............ *B25J 9/163* (2013.01); *Y10S 901/03* (2013.01)

(58) Field of Classification Search
CPC .......... B25J 9/161; B25J 9/163; G05B 13/04; G05B 2219/42155; G05B 2219/39011; G05B 2219/39295; G05B 2219/39296; G05B 2219/33036; G05B 2219/32017; G05B 2219/32342
See application file for complete search history.

(56) References Cited

U.S. PATENT DOCUMENTS

| | | |
|---|---|---|
| 5,305,652 A | 4/1994 | Zimmer |
| 6,055,524 A | 4/2000 | Cheng |
| 7,225,173 B2 | 5/2007 | Manevitz et al. |
| 7,617,166 B2 | 11/2009 | Haudrich et al. |
| 7,822,500 B2 | 10/2010 | Kobayashi et al. |
| 8,958,912 B2 | 2/2015 | Blumberg et al. |
| 9,134,454 B2 | 9/2015 | Mishev et al. |
| 9,187,984 B2 | 11/2015 | Usadi et al. |
| 9,671,777 B1 | 6/2017 | Aichele et al. |
| 9,811,074 B1 | 11/2017 | Aichele et al. |
| 2015/0209960 A1 | 7/2015 | Li et al. |

(Continued)

FOREIGN PATENT DOCUMENTS

WO  2014025518 A1  2/2014

OTHER PUBLICATIONS

Agrawal et al.; Publication entitled "Learning to Poke by Poking: Experimental Learning of Intuitive Physics" dated Feb. 15, 2017; 10 pages.

(Continued)

*Primary Examiner* — Dale Moyer
(74) *Attorney, Agent, or Firm* — Dorton & Willis, LLP

(57) ABSTRACT

Systems, methods, and computer program products for programming a controller to control a process. A training module is trained to provide predicted responses of the process to control signals using a generic simulator to model the process. Once the training module has been trained, the controller is programmed to control the process by coupling the controller to the training module and using the training module to generate predicted responses of the process to the reception of control signals from the controller. As part of the programming process, one or more parameters of a control program resident on the controller may be adjusted to reduce errors between the responses predicted by the training module and the desired responses intended to be caused by the control signals.

20 Claims, 4 Drawing Sheets

(56) References Cited

U.S. PATENT DOCUMENTS

| | | | |
|---|---|---|---|
| 2015/0339570 A1* | 11/2015 | Scheffler | G06N 3/04 |
| | | | 706/16 |
| 2017/0028553 A1 | 2/2017 | Tsuda et al. | |
| 2017/0285584 A1 | 10/2017 | Nakagawa et al. | |
| 2019/0084151 A1* | 3/2019 | Bai | B25J 9/1612 |
| 2019/0126472 A1* | 5/2019 | Tunyasuvunakool | B25J 9/163 |
| 2019/0272465 A1* | 9/2019 | Kimura | G06N 3/006 |

OTHER PUBLICATIONS

Lenz et al.; Publication entitled "DeepMPC: Learning Deep Latent Features for Model Predictive Control"; 9 pages.

Thompson et al.; Publication entitled "Accelerating Eulerian Fluid Simulation With Convolutional Networks" dated Jun. 22, 2017; 10 pages.

\* cited by examiner

PROCESS CONTROL USING DEEP LEARNING TRAINING MODEL

BACKGROUND

This invention generally relates to controllers for controlling processes and, in particular, to methods, systems, and computer program products for programming a controller to control a robot using a training module that provides a predicted response of the robot to control outputs from the controller.

Industrial robots typically include a controller and a robotic arm equipped with an end-effector, such as a gripper or other tool. The controller is programmed to control operation of the robot through selective activation of actuators coupled to the arm and end-effector so that the robot performs a task. One way the controller may be programmed is by specifying positions and trajectories for the robot arm based on a three-dimensional coordinate system. This may be accomplished, for example, by physically moving the robot to one or more desired poses while the controller logs positions of the robot into memory. The robotic controller may also be programmed by mapping the robot and its physical operating environment into a virtual environment on a computer. The virtual environment may then be used to simulate the response of the robot to commands from the controller, thereby allowing the controller to be programmed without the need to operate the robot in its physical operating environment. Use of virtual environments may reduce the amount of time necessary to program the controller as well as improve safety by allowing multiple scenarios to be tested before the controller is used to operate the robot.

One challenge with developing control programs in a virtual environment is that simulating operation of the robot can be computationally intensive. For example, simulating operation of a robot in an environment that requires modeling of complex physical processes is prohibitive because of the high computational costs involved in predicting the response of the robot and/or object being manipulated to commands from the controller. In particular, controllers that use "deep learning" methods for controlling a robot in a complex physical operating environment typically a require a large number of training cycles to learn how to control the robot. Because simulating a complex environment can require significant computational resources for each training cycle, training controllers that use deep learning can be cost-prohibitive. Using simpler simulations that make certain idealized assumptions (e.g., that all bodies involved are ridged) often do not manage to simulate the process accurately enough for deep learning systems to reach a useful level of training. In any case, even for simplified simulations, it is desirable to reduce the computational resources required to train the controller.

Thus, there is a need for improved systems, methods, and computer program products for programming robotic controllers.

SUMMARY

In an embodiment of the invention, a method of controlling a robot is provided. The method includes training a training module to provide a predicted response of a robotically implemented process to a control signal using a simulation module to model the process. The trained training module is coupled to a controller, and the controller trained to control the process using the trained training module to generate the predicted response of the process in response to the robot receiving the control signal from the controller.

In another aspect of the invention, the training module may include a process model, and training the training module may include generating, by the training module, the predicted response of the process to the control signal and generating, by the simulation module, a simulated response of the process to the control signal. The method may then compare the predicted response to the simulated response and adjust one or more parameters of the process model based on a difference between the predicted response and the simulated response.

In another aspect of the invention, the process may include a task performed by the robot, and the control signal may include one or more commands that cause the robot to perform the task.

In another aspect of the invention, the task may include manipulation of an object by the robot.

In another aspect of the invention, the controller may include a control program, and programming the controller may include transmitting, by the controller, the control signal to the training module and generating, by the training module, the predicted response of the process to the control signal. The method may then compare the predicted response of the process to a desired response of the process, and adjust one or more parameters of the control program based on a difference between the predicted response and the desired response.

In another aspect of the invention, the simulation module may use a generic simulator to simulate the response of the process.

In another aspect of the invention, the generic simulator may use finite element analysis to simulate the response of the process.

In another aspect of the invention, the training module may include an artificial neural network.

In another aspect of the invention, the controller may be used to control the robot.

In another embodiment of the invention, a system for controlling the robot is provided. The system includes one or more processors and memory coupled to the one or more processors. The memory stores program code that, when executed by the one or more processors, causes the system to train the training module to provide the predicted response of the robotically implemented process to the control signal using the simulation module to model the process. The program code further causes the system to train the controller to control the process using the trained training module to generate the predicted response of the process in response to the robot receiving the control signal from the controller.

In another aspect of the invention, the training module may include the process model, and the program code may cause the system to train the training module by generating the predicted response of the process to the control signal, generating the simulated response of the process to the control signal, comparing the predicted response to the simulated response, and adjusting one or more parameters of the process model based on the difference between the predicted response and the simulated response.

In another aspect of the invention, the controller may include the control program, and the program code may cause the system to program the controller by transmitting the control signal to the training module, generating the predicted response of the process to the control signal, comparing the predicted response of the process to the desired response of the process, and adjusting one or more parameters of the control program based on the difference between the predicted response and the desired response.

In another embodiment of the invention, a computer program product for controlling the robot is presented. The computer program product includes a non-transitory computer-readable storage medium and program code stored on the non-transitory computer-readable storage medium. The program code, when executed by one or more processors, causes the one or more processors to train the training module to provide the predicted response of the robotically implemented process to the control signal using the simulation module to model the process, and train the controller to control the process using the trained training module to generate the predicted response of the process in response to the robot receiving the control signal from the controller.

In another aspect of the invention, the training module may include the process model, and the program code may cause the one or more processors to train the training module by generating the predicted response of the process to the control signal, generating the simulated response of the process to the control signal, comparing the predicted response to the simulated response, and adjusting the one or more parameters of the process model based on the difference between the predicted response and the simulated response.

In another aspect of the invention, the controller may include the control program, and the program code may cause the one or more processors to program the controller by transmitting the control signal to the training module, generating the predicted response of the process to the control signal, comparing the predicted response of the process to the desired response of the process, and adjusting one or more parameters of the control program based on the difference between the predicted response and the desired response.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention may be used to program controllers that use machine-learning, and may reduce the total amount of computing resources needed to program the controllers as compared to conventional systems and methods. In an exemplary embodiment of the invention, a process model for a specific operating environment is generated using a simulation module to simulate operation of a robot within the specific operating environment, e.g., with a specific process, tool, and/or workpiece. The trained process model may then used to train a robotic controller. The process model may be implemented using a machine-learning module (e.g., a neural network) that is trained to predict the response of the robot to commands or other control outputs from the controller in the specific operating environment. Using the process model to simulate the robot's response to control outputs rather than training data generated by the simulation module or collected from real-world testing may reduce the time and/or computational resources required to train the controller. In particular, the total computational cost of programming the controller may be reduced for scenarios in which the computational cost saved by training the controller using the process model exceeds the computational cost of training the process model.

Figure 1:
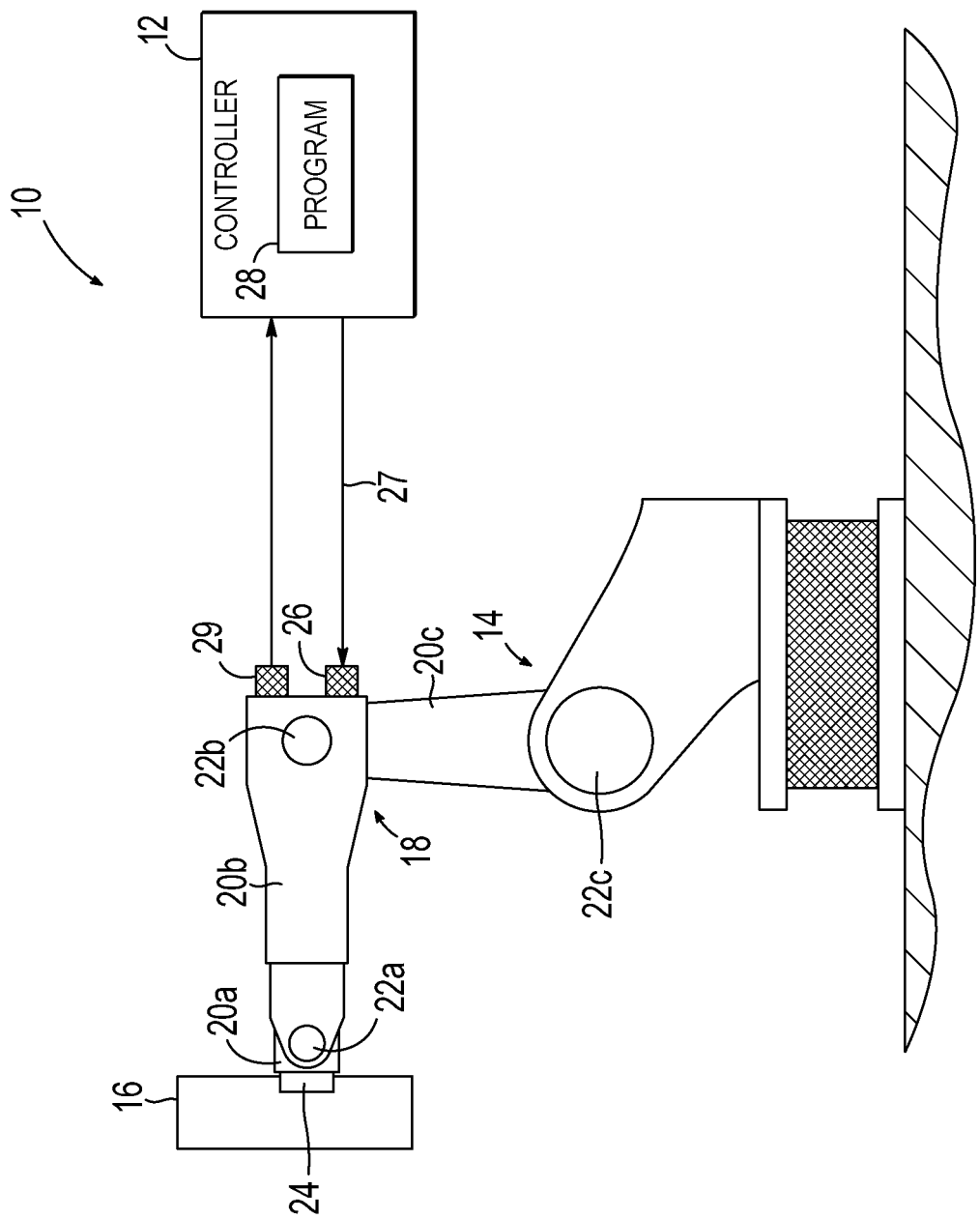
FIG. 1 is a diagrammatic view of an exemplary operating environment including a robot, a controller that controls the robot, and an object that is manipulated by the robot.

FIG. 1 depicts an operating environment 10 in accordance with an embodiment of the invention that includes a controller 12 in communication with a robot 14 that is being used to manipulate an object 16. The robot 14 may include an arm 18 comprising one or more members 20a-20c coupled to each other by joints 22a-22c having one or more axes that allow the members 20a-20c to move relative to each other. A distal end of the arm 18 may be coupled to an end-effector 24 comprising, for example, a gripper, cutter, welder, or other tool that may be used to hold, modify, or otherwise manipulate the object 16. The members 20a-20c and/or end-effector 24 may each be coupled to one or more actuators 26 configured to operate the respective member 20a-20c and/or end-effector 24 in response to control outputs 27 from the controller 12.

The actuators 26 may comprise, for example, electric or hydraulic motors that are actuated by the controller 12 in accordance with a control program 28. The control program 28 may be configured to cause the robot 14 to move and/or operate the end-effector 24 to perform a task. The robot 14 may also include one or more sensors 29, such as force, torque, position, optical, distance, and/or any other sensor suitable for providing feedback to the controller 12 that relates to operation of the robot 14.

Figure 2:
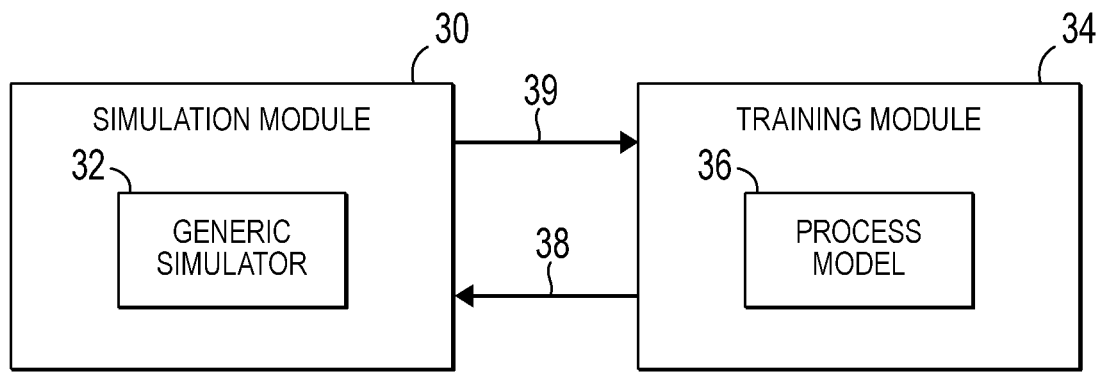
FIG. 2 is a diagrammatic view of an exemplary training module including a process model that models a process performed by the robot of FIG. 1, and a simulation module that may be used to train the training module.

FIG. 2 depicts a simulation module 30 that includes a generic simulator 32 (e.g., a physics engine), and a training module 34 that includes a process model 36. The simulation module 30 and training module 34 may be implemented, for example, using one or more computers. The generic simulator 32 may comprise a high-performance scientific simulator that uses finite element analysis, fluid dynamics, and/or other suitable algorithms that describe the behavior of a physical environment to simulate the response of the robot 14, the object 16 being manipulated by the robot 14, and/or any other element of the operating environment 10, to control outputs 27 from the controller 12. The process model 36 may comprise a data structure that defines a circuit, such as an artificial neural network, which outputs a predicted response 38 of the robot 14, the object 16 being manipulated by the robot 14, and/or other elements of the operating environment 10, to a control output transmitted to the robot 14.

The simulation module 30 may transmit training data 39 to the training module 12. The training data 39 may include a response of one or more elements of the operating environment 10 to the control output. This response may be determined using the generic simulator 32, or may be a recorded response obtained by providing the control outputs 27 to the robot 14 in the operating environment 10. The simulation module 30 and/or training module 34 may compare the predicted response 38 to the simulated or recorded response, and adjust one or more parameters of the process model 36 to reduce any errors in the predicted response 38. Training cycles in which the process model 36 generates the predicted response 38, and one or more parameters of the process model 36 are adjusted to reduce errors between the predicted response 38 and the simulated or recorded response, may be repeated until the errors are below an acceptable threshold.

Figure 3:
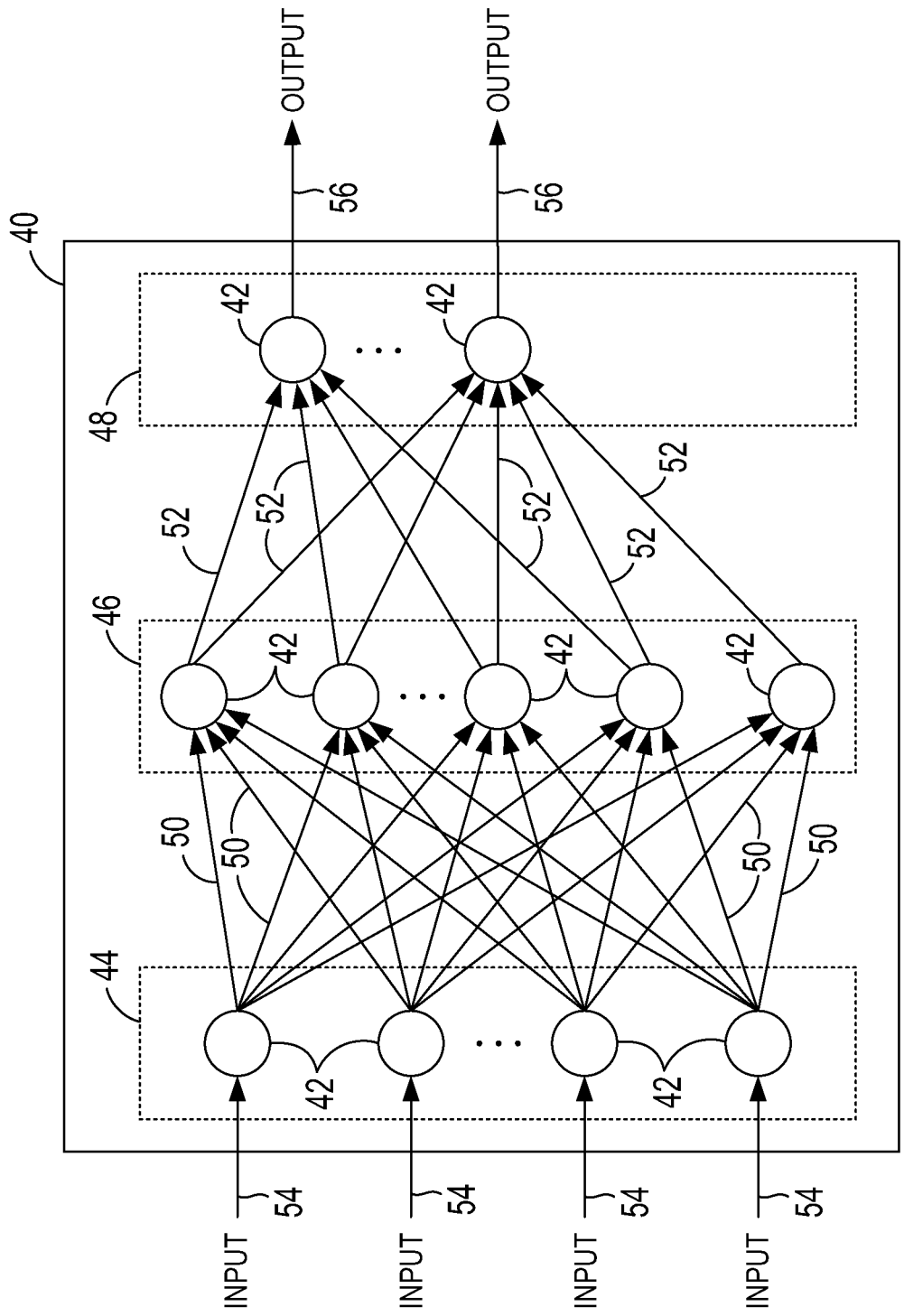
FIG. 3 is a diagrammatic view of an exemplary artificial neural network that may be used by the process model of FIG. 2 to predict a response of the robot to control outputs from the controller of FIG. 1.

Referring now to FIG. 3, an exemplary artificial neural network 40 that may be defined by, or be a part of, the process model 36 includes plurality of nodes 42 interconnected in a manner analogous to a biological neural network made up of neurons and synapses. The nodes 42 may be arranged in a plurality of layers (e.g., an input layer 44, a hidden layer 46, and an output layer 48) each comprising one or more nodes 42, with the nodes in each layer connected to one or more nodes in adjacent layers by weighted links 50, 52.

The input layer 44 may receive a plurality of input signals 54 from outside the neural network 40 (e.g., control outputs and/or sensor outputs received as training data 39 from the simulation module 30) and couple the input signals 54 to the hidden layer 46 over the weighted links 50. Each node 42 in the hidden layer 46 may sum the weighted signals received over the weighted links 50 and couple the resulting summed signal to each node 42 of output layer 48 over weighted links 52. The nodes 42 of output layer 48 may in turn provide one or more output signals 56 that characterize the predicted response and/or state of the robot 14, object 16, actuators 26, sensors 29, and/or any other element or condition of the operating environment 10 based on the input signals 54. Although illustrated as having three layers for exemplary purposes, the artificial neural network 40 may have more than three layers (e.g., by adding additional hidden layers) or fewer than three layers. Thus, it should be understood that embodiments of the invention are not limited to artificial neural networks having any specific number of nodes, layers, inputs, outputs, or links.

With continued reference to FIG. 3, and referring again to FIG. 2, the output signals 56 from the neural network may be provided as, or used to generate, the predicted response 38. The simulation module 30 and/or training module 34 may compare the predicted response 38 of process model 36 to the response predicted using the generic simulator 32 and/or a recorded response of the robot 14. Based on the comparison, the process model 36 may be adjusted, e.g., by altering the weight of one or more of the links 50, 52 connecting the nodes 42 of hidden layer 46 to the nodes 42 of input and/or output layers 44, 48. The weight of the one or more links 50, 52 may be adjusted by a training algorithm that optimizes the output signals 56 to provide results that match those predicted using the generic simulator 32 or measured using the robot 14. For example, the training module 34 may use a deep learning neural network algorithm to train the neural network 40 to minimize errors between the output signals 56 and the results determined by the simulation module 30 over a range of control outputs and operating conditions.

In an embodiment of the invention, training data may be generated using a specific operating environment 10 to learn the behavior of the robot 14 when manipulating a specific object 16 under specific conditions. The training data may be generated by the simulation module 30 or by performing the process to be modeled in a physical environment, e.g., by manipulating the object 16 with the robot 14. The measured or simulated training data may be recorded and used to train the process model 36 by comparing the training data to the predicted response 38 as described above. In this case, the resulting process model 36 may only work for the specific object and operating environment used to generate the training data. However, once trained, the process model 36 may generate predicted responses 38 much faster than the simulation module 30 can simulate the process, or than the responses can be measured by operating the robot 14 in the operating environment 10.

Figure 4:
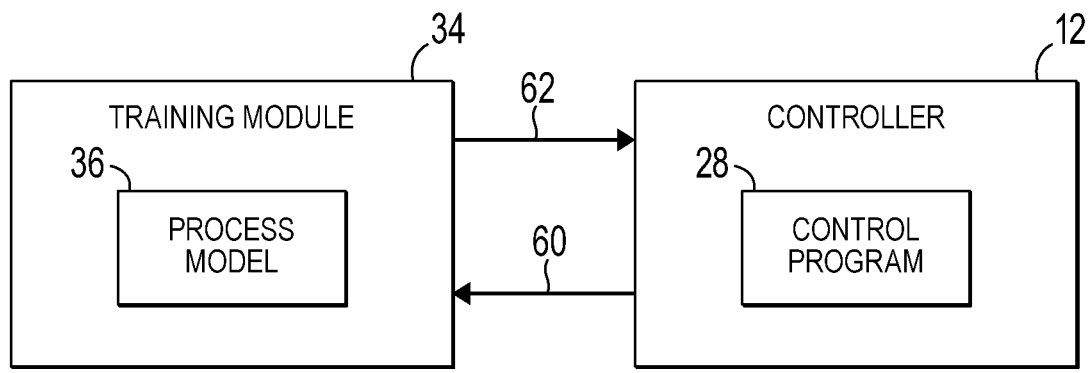
FIG. 4 is a diagrammatic view of the training module of FIG. 2 being used to program the controller to control the robot of FIG. 1.
Figure 5:
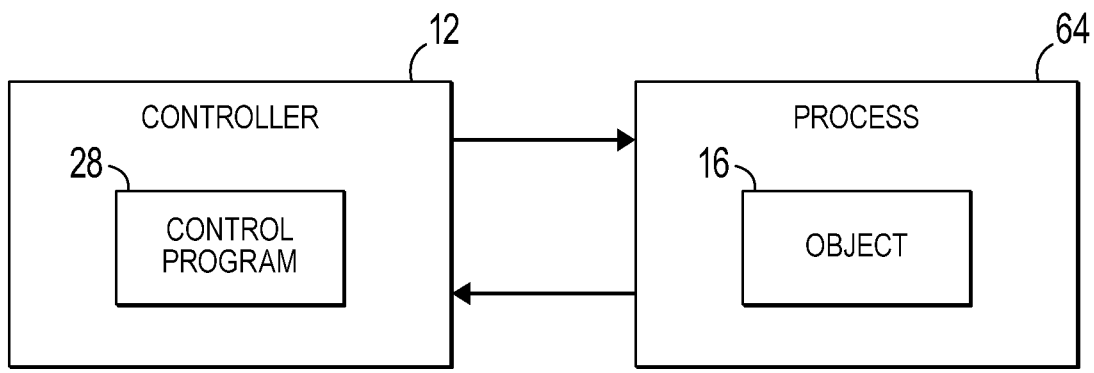
FIG. 5 is a diagrammatic view of the controller of FIG. 4 and a process being controlled by the controller.

FIG. 4 depicts the controller 12 being programmed using the training module 34. The control program 28 may generate a control output 60 which is transmitted to the training module 34 by the controller 12. The control output 60 may be processed using the process model 36 to generate a predicted response 62. The predicted response 62 may include the response of the robot 14, the response of the object 16 being manipulated by the robot 14, sensor outputs resulting from the response of the robot 14 and/or object 16, and/or the responses of any other elements of the operating environment 10. A training algorithm may compare the predicted response 62 to a desired response and adjust the control program 28 to reduce any differences between the predicted and desired responses. These training cycles may be repeated until the control outputs and/or perception performance of the control program 28 satisfies some performance criteria. Once the control program 28 has been trained, the controller 12 may be used to control a process 64 (e.g., operation of the robot 14 to perform the task using the object 16) as depicted in FIG. 5.

Figure 6:
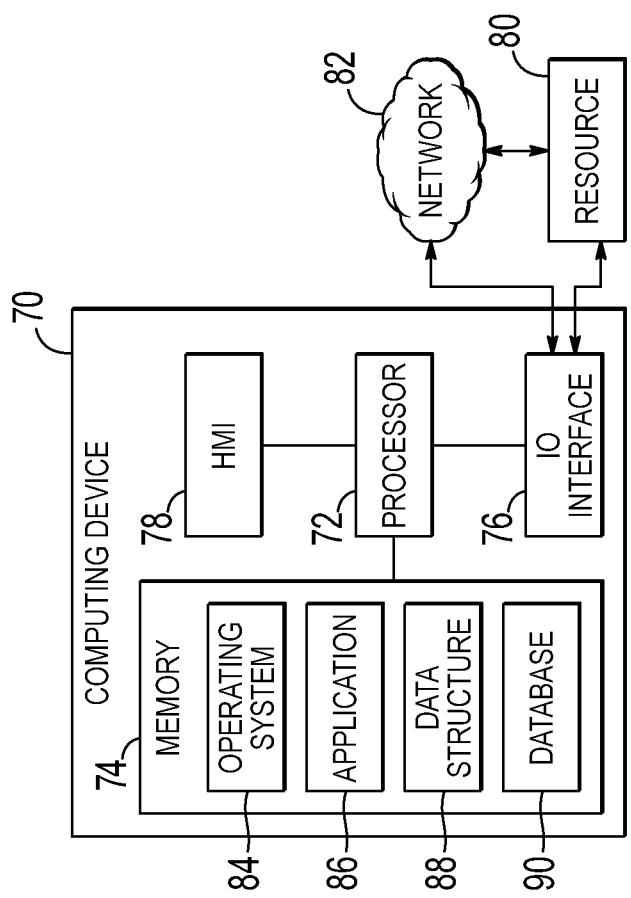
FIG. 6 is a diagrammatic view of an exemplary computer that may be used to implement one or more of the components and/or processes shown in FIGS. 1-5.

By way of example, a process model 36 may be generated for a process involving an object 16 comprising a bottle half filled with a liquid. The process may be, for example, operating the robot 14 to throw the bottle through an aperture. To this end, training data for the process may be generated by a complex and time consuming high fidelity finite element model simulation. The finite element mode simulation may be able to accurately simulate any amount of liquid in the bottle or different liquids or different bottle geometries, and is thus referred to as a generic simulation. The resulting learned model may only be accurate for the specific settings used to generate the data. e.g., liquid level, liquid type, bottle shape, etc. However, the learned model may also be much faster at predicting the response of the process to control inputs with little or no decrease in precision as compared to the generic simulation. A robot learning algorithm can thus use the trained model to learn/optimize its control or perception model against this learned process model, which may result in much faster training of the controller Referring now to FIG. 6, exemplary embodiments of the invention described above, or portions thereof, may be implemented using one or more computer devices or systems, such as exemplary computer 70. The computer 70 may include a processor 72, a memory 74, an input/output (I/O) interface 76, and a Human Machine Interface (HMI) 78. The computer 70 may also be operatively coupled to one or more external resources 80 via the network 82 and/or I/O interface 76. External resources may include, but are not limited to, servers, databases, mass storage devices, peripheral devices, cloud-based network services, or any other resource that may be used by the computer 70.

The processor 72 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 74. Memory 74 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 72 may operate under the control of an operating system 84 that resides in memory 74. The operating system 84 may manage computer resources so that computer program code embodied as one or more computer software applications, such as an application 86 residing in memory 74, may have instructions executed by the processor 72. In an alternative embodiment, the processor 72 may execute the application 86 directly, in which case the operating system 84 may be omitted. One or more data structures 88 may also reside in memory 74, and may be used by the processor 72, operating system 84, or application 86 to store or manipulate data.

The I/O interface 76 may provide a machine interface that operatively couples the processor 72 to other devices and systems, such as the external resource 80 or the network 82. The application 86 may thereby work cooperatively with the external resource 80 or network 82 by communicating via the I/O interface 76 to provide the various features, functions, applications, processes, or modules comprising embodiments of the invention. The application 86 may also have program code that is executed by one or more external resources 80, or otherwise rely on functions or signals provided by other system or network components external to the computer 70. Indeed, given the nearly endless hardware and software configurations possible, persons having ordinary skill in the art will understand that embodiments of the invention may include applications that are located externally to the computer 70, distributed among multiple computers or other external resources 80, or provided by computing resources (hardware and software) that are provided as a service over the network 82, such as a cloud computing service.

The HMI 78 may be operatively coupled to the processor 72 of computer 70 in a known manner to allow a user to interact directly with the computer 70. The HMI 78 may include video or alphanumeric displays, a touch screen, a speaker, and any other suitable audio and visual indicators capable of providing data to the user. The HMI 78 may also include input devices and controls such as an alphanumeric keyboard, a pointing device, keypads, pushbuttons, control knobs, microphones, etc., capable of accepting commands or input from the user and transmitting the entered input to the processor 72.

A database 90 may reside in memory 74, and may be used to collect and organize data used by the various systems and modules described herein. The database 90 may include data and supporting data structures that store and organize the data. In particular, the database 90 may be arranged with any database organization or structure including, but not limited to, a relational database, a hierarchical database, a network database, or combinations thereof. A database management system in the form of a computer software application executing as instructions on the processor 72 may be used to access the information or data stored in records of the database 90 in response to a query, which may be dynamically determined and executed by the operating system 84, other applications 86, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of controlling a robot, the method comprising:
    training a training module to provide a predicted response of a robotically implemented process to a control signal using a simulation module to model the process;
    coupling the trained training module to a controller; and
    training the controller to control the process using the trained training module to generate the predicted response of the process in response to the robot receiving the control signal from the controller.

2. The method of claim 1 wherein the training module includes a process model, and training the training module comprises:
    generating, by the training module, the predicted response of the process to the control signal;
    generating, by the simulation module, a simulated response of the process to the control signal;
    comparing the predicted response to the simulated response; and
    adjusting one or more parameters of the process model based on a difference between the predicted response and the simulated response.

3. The method of claim 1 wherein the process includes a task performed by the robot, and the control signal includes one or more commands that cause the robot to perform the task.

4. The method of claim 3 wherein the task includes manipulation of an object by the robot.

5. The method of claim 1 wherein the controller includes a control program, and programming the controller comprises:
    transmitting, by the controller, the control signal to the training module;
    generating, by the training module, the predicted response of the process to the control signal;
    comparing the predicted response of the process to a desired response of the process; and
    adjusting one or more parameters of the control program based on a difference between the predicted response and the desired response.

6. The method of claim 1 wherein the simulation module uses a generic simulator to simulate the response of the process.

7. The method of claim 6 wherein the generic simulator uses finite element analysis to simulate the response of the process.

8. The method of claim 1 wherein the training module includes an artificial neural network.

9. The method of claim 1 further comprising:
    using the controller to control the robot.

10. A system for controlling a robot, the system comprising:
    one or more processors; and
    memory coupled to the one or more processors and storing program code that, when executed by the one or more processors, causes the system to:
        train a training module to provide a predicted response of a robotically implemented process to a control signal using a simulation module to model the process; and
        train a controller to control the process using the trained training module, after the controller is coupled with the training module, to generate the predicted response of the process in response to the robot receiving the control signal from the controller.

11. The system of claim 10 wherein the training module includes a process model, and the program code causes the system to train the training module by:
   generating the predicted response of the process to the control signal;
   generating a simulated response of the process to the control signal;
   comparing the predicted response to the simulated response; and
   adjusting one or more parameters of the process model based on a difference between the predicted response and the simulated response.

12. The system of claim 10 wherein the process includes a task performed by the robot, and the control signal includes one or more commands that cause the robot to perform the task.

13. The system of claim 12 wherein the task includes manipulation of an object by the robot.

14. The system of claim 10 wherein the controller includes a control program, and the program code causes the system to program the controller by:
   transmitting the control signal to the training module;
   generating the predicted response of the process to the control signal;
   comparing the predicted response of the process to a desired response of the process; and
   adjusting one or more parameters of the control program based on a difference between the predicted response and the desired response.

15. The system of claim 10 wherein the simulation module uses a generic simulator to simulate the response of the process.

16. The system of claim 15 wherein the generic simulator uses finite element analysis to simulate the response of the process.

17. The system of claim 10 wherein the training module includes an artificial neural network.

18. A computer program product for controlling a robot, the computer program product comprising:
   a non-transitory computer-readable storage medium; and
   program code stored on the non-transitory computer-readable storage medium that, when executed by one or more processors, causes the one or more processors to:
      train a training module to provide a predicted response of a robotically implemented process to a control signal using a simulation module to model the process; and
      train a controller to control the process using the trained training module, after the controller is coupled with the training module, to generate the predicted response of the process in response to the robot receiving the control signal from the controller.

19. The computer program product of claim 18 wherein the training module includes a process model, and the program code causes the one or more processors to train the training module by:
   generating the predicted response of the process to the control signal;
   generating a simulated response of the process to the control signal;
   comparing the predicted response to the simulated response; and
   adjusting one or more parameters of the process model based on a difference between the predicted response and the simulated response.

20. The computer program product of claim 18 wherein the controller includes a control program, and the program code causes the one or more processors to program the controller by:
   transmitting the control signal to the training module;
   generating the predicted response of the process to the control signal;
   comparing the predicted response of the process to a desired response of the process; and
   adjusting one or more parameters of the control program based on a difference between the predicted response and the desired response.

\* \* \* \* \*